United States Patent
Rose

(10) Patent No.: US 8,417,985 B2
(45) Date of Patent: Apr. 9, 2013

(54) ADJUSTING SYSTEM CLOCK TO FASTER SPEED UPON RECEIVING MASS STORAGE COMMAND AND BACK TO LOWER SPEED UPON COMPLETION OF ALL COMMANDS

(75) Inventor: Philip David Rose, Islip (GB)

(73) Assignee: PLX Technology, Inc., Sunnyvale, CA (US)

( * ) Notice: Subject to any disclaimer, the term of this patent is extended or adjusted under 35 U.S.C. 154(b) by 433 days.

(21) Appl. No.: 12/782,501

(22) Filed: May 18, 2010

(65) Prior Publication Data

US 2011/0289340 A1 Nov. 24, 2011

(51) Int. Cl.
*G06F 1/04* (2006.01)
(52) U.S. Cl. .................... 713/600; 713/500
(58) Field of Classification Search .............. None
See application file for complete search history.

(56) References Cited

U.S. PATENT DOCUMENTS

| | | | |
|---|---|---|---|
| 5,093,841 A | 3/1992 | Vancraeynest | |
| 6,715,089 B2 | 3/2004 | Zdravkovic | |
| 7,197,653 B2 * | 3/2007 | Kondo | 713/322 |
| 2009/0132837 A1 * | 5/2009 | Kumar | 713/320 |

* cited by examiner

*Primary Examiner* — Kenneth Kim
(74) *Attorney, Agent, or Firm* — Beyer Law Group LLP

(57) ABSTRACT

In a first embodiment of the present invention, a method for dynamically adjusting a system clock of a plurality of system clock-controlled components in a system is provided, the method comprising: detecting the receipt of a command at a non-system clock-controlled component of the system; and adjusting the system clock to a fast speed based on the detecting. This embodiment may also include: determining that the command has been completed; determining that there are no outstanding commands in the plurality of system clock-controlled components; and adjusting the system clock to a slow speed based on the determination that there are no outstanding commands in the plurality of system clock-controlled components.

16 Claims, 4 Drawing Sheets

ADJUSTING SYSTEM CLOCK TO FASTER SPEED UPON RECEIVING MASS STORAGE COMMAND AND BACK TO LOWER SPEED UPON COMPLETION OF ALL COMMANDS

BACKGROUND OF THE INVENTION

1. Field of the Invention

The present invention relates generally to computer devices. More specifically, the present invention relates to dynamically setting a system clock rate of a computer system based on outstanding commands needing to be executed.

2. Description of the Related Art

Processors in a computer system operate at a certain clock rate. The clock rate is the rate (typically measured in cycles per second or hertz) for the frequency of the clock. Typically a processor can execute a certain number of commands per cycle, so the clock rate roughly equates to the number of commands the processor is capable of handling per second (although since each processor can be capable of executing a different number of commands per cycle, using the clock rate as a comparison between processor architectures generally is not helpful).

Some processors offer the ability to dynamically alter their clock rate. For example, the Intel SpeedStep™ processor can slow down or speed up its clock rate at runtime. This allows the processor to meet the instantaneous performance needs of the operation being performed, while minimizing power draw and heat dissipation.

Prior art techniques, however, base the dynamic processor speed on the current load of the processor (i.e., how busy the processor is). When the processor is not busy, the clock rate is adjusted downwards to save power and reduce heat dissipation. When the processor gets busy again, the clock rate is adjusted back upwards to meet the demand.

This technology can work well in the case of processors themselves, but certain devices contain multiple modules that share a system clock. For example, a Universal Serial Bus (USB)-to-Serial ATA (SATA) bridge device may contain a processor, memory, a redundant array of independent disks (RAID) engine, an encryption core, etc., all of which may be linked to the same system clock. Altering the processor's clock rate alone based on the load of the processor is simply not feasible in such an architecture, since these components may require matching clock rates in order to operate at peak efficiency (i.e., avoid excessive delays in processing commands).

This problem is amplified even further in USB3.0-to-SATA bridges. For high performance, it is necessary to clock the system of such a bridge to a high clock rate to meet the high USB3.0 burst rate of 500 MBps. This high system clock rate utilizes a significant amount of power.

SUMMARY OF THE INVENTION

In a first embodiment of the present invention, a method for dynamically adjusting a system clock of a plurality of system clock-controlled components in a system is provided, the method comprising: detecting the receipt of a command at a non-system clock-controlled component of the system; and adjusting the system clock to a fast speed based on the detecting. This embodiment may also include: determining that the command has been completed; determining that there are no outstanding commands in the plurality of system clock-controlled components; and adjusting the system clock to a slow speed based on the determination that there are no outstanding commands in the plurality of system clock-controlled components.

In a second embodiment of the present invention, a method for dynamically adjusting the system clock rate of a bridge is provided, the method comprising: receiving a command from a host computer in a first protocol; setting a system clock for the bridge to a fast speed upon receipt of the command; determining if there are any outstanding commands in the bridge; and if there are no outstanding commands in the bridge, setting the system clock to a slow speed.

In a third embodiment of the present invention, a bridge is provided comprising: a system clock; a plurality of system clock-controlled components; and a plurality of non-system clock-controlled components, wherein at least one of the non-system clock controlled components is designed to: detect the receipt of a command at a non-system clock-controlled component of the system; and send a message to a system clock divider to cause the system clock divider to change the rate of the system clock from a slow speed to a fast speed.

In a fourth embodiment of the present invention, a mass storage engine is provided comprising: logic to control a system clock by detecting the receipt of a command and causing the system clock to increase speed based on the receipt of the command, and to determine that a component other than the mass storage engine has no outstanding commands left and to cause the system clock to decrease speed based on the determination that the component other than the mass storage engine has no outstanding commands left.

In a fifth embodiment of the present invention, a program storage device readable by a machine tangibly embodying a program of instructions executable by the machine to perform a method for dynamically adjusting a system clock of a plurality of system clock-controlled components in a system is provided, the method comprising: detecting the receipt of a command at a non-system clock-controlled component of the system; and adjusting the system clock to a fast speed based on the detecting. In this embodiment, the method may further include: determining that the command has been completed; determining that there are no outstanding commands in the plurality of system clock-controlled components; and adjusting the system clock to a slow speed based on the determination that there are no outstanding commands in the plurality of system clock-controlled components.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

The present invention involves dynamically modifying the clock rate of multiple portions of a system based on the number of outstanding commands to be executed. When there are no commands outstanding (i.e., the system is idle), the system clock rate is reduced to a lower value with a corresponding reduction in power consumption. When a new command is received, the system clock is immediately switched back to a higher value.

Figure 1:
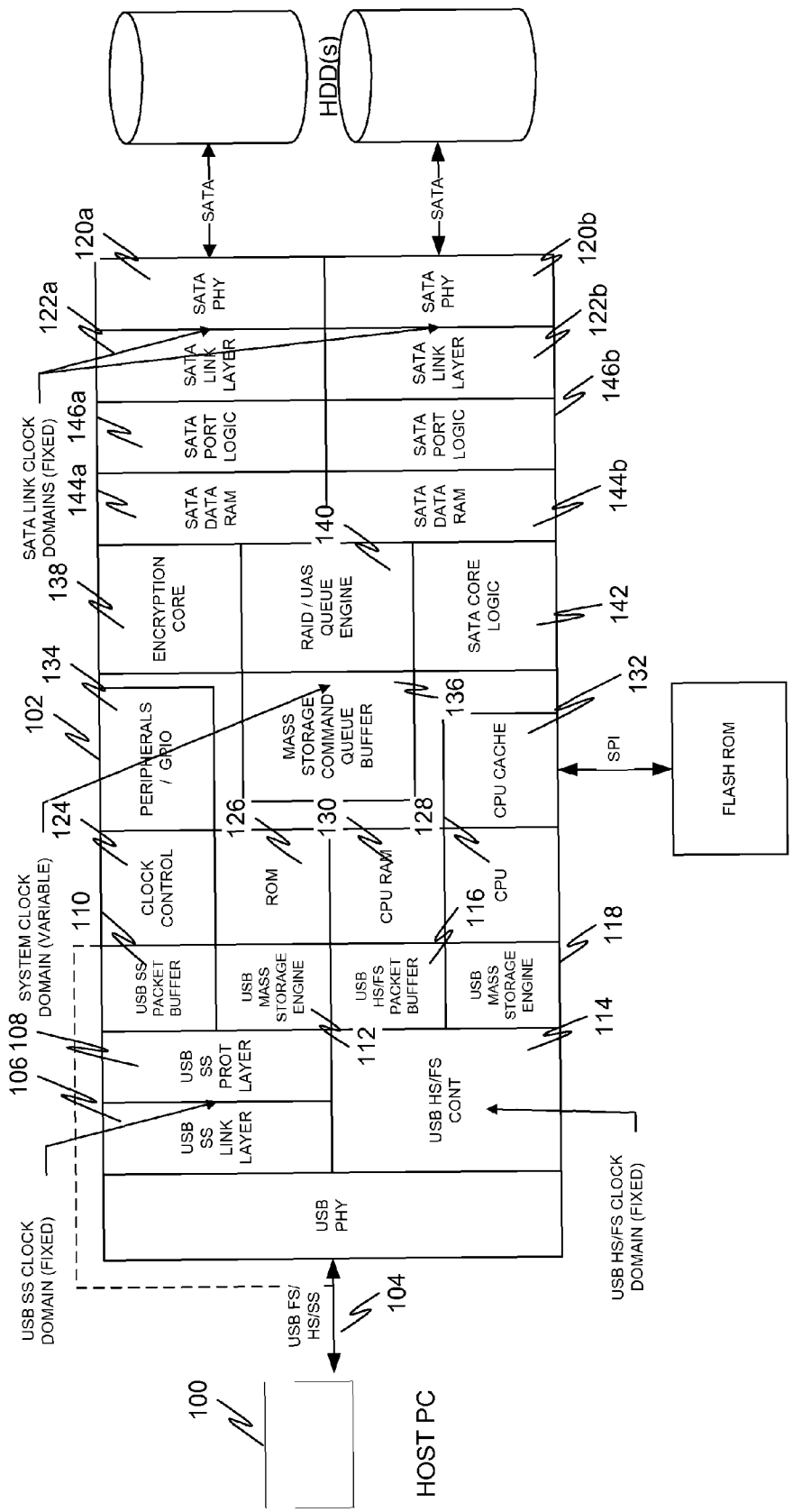
FIG. 1 is a diagram illustrating a USB-to-SATA bridge in accordance with an embodiment of the present invention.

FIG. 1 is a diagram illustrating a USB-to-SATA bridge in accordance with an embodiment of the present invention. It should be noted that the USB-to-SATA bridge is only one example of a bridge or other system of components that can be utilized with the present invention. As such, the following description is not intended to be limiting.

Here, a host PC 100 connects to the bridge 102 via a USB cable 104. There are a number of components/layers on the bridge 102 that then run at a clock speed based on the USB3.0 base speed, which is a fixed amount. These components/layers include USB super speed (SS) link layer 106, USB SS protocol layer 108, USB SS packet buffer 110, and USB mass storage engine 112. There are also a number of components/layers on the bridge 102 that run at a clock speed based on the USB 1.x or 2.0 base speed, which are also fixed amounts. These components/layers include USB High Speed/Full Speed (HS/FS) Controller 114, USB HS/FS packet buffer 116, and USB mass storage engine 118.

There are also a number of components/layers on the bridge 102 that run at a clock speed based on the SATA link, which is also fixed. This includes SATA physical layers 120*a*, 120*b*, and SATA link layers 122*a*, 122*b*.

In an embodiment of the present invention, a number of the components on the bridge operate at a variable clock rate. In this embodiment of the present invention, this includes clock control 124, read only memory 126, central processing unit (CPU) 128, CPU random access memory (RAM) 130, CPU cache 132, peripherals 134, mass storage command queue buffer 136, encryption core 138, RAID/UAS queue engine 140, SATA core logic 142, SATA data RAMs 144*a*, 144*b*, and SATA port logic 146*a*, 146*b*. UAS stands for USB Attached SCSI.

The USB mass storage engines 112, 118 are the blocks which receive disk commands from either the USB SS interface or the FS/HS interface. Logic may be added to these blocks that causes the components/layers under variable clock control to dynamically raise or lower speed when necessary. For example, if the system clock is set at a slow speed because there are no outstanding commands in the mass storage command queue buffer 136, when a new command is received at the USB mass storage engine 112 or 118, the system clock may be immediately set to a fast speed. Because this logic is contained in a component outside of one operating under the system clock, this enables the system clock to be set to fast before the command reaches any of the components operating under the system clock. This essentially makes the dynamic speed adjustment completely transparent, as the speed of processing of a new command is completely unaffected by the decision to lower the system clock rate. This is in contrast to a system where, for example, the CPU 128 itself contains the logic to determine when to adjust the clock speed, as in such systems there would be a delay between when the command is detected and the clock speed adjusted, and thus a command received while the CPU was operating at a slow speed would be handled slower than if it had been received while the CPU was operating at a fast speed. The present invention allows the command to be handled at the same speed no matter what speed the CPU 128 happens to be operating at when the command is received.

It should be noted that the logic for dynamically changing the system clock rate may be located in other places in the system, either in addition to or in lieu of the mass storage engine(s). For example, in one embodiment of the present invention, the RAID/UAS queue engine 140 may also contain logic for changing the system speed. This component, which also performs the Bulk only Transport (BoT) mass storage protocol, may use the logic to fix a race condition that can result from the small latency in handling commands. Specifically, the RAID/UAS queue engine 140 could complete the last command after a new command is received. In such an instance, the clock switching logic would get a fast assert command followed shortly by a slow assert command, potentially resulting in the new command being executed at the wrong (slower) speed. The RAID/UAS queue engine 140 could include logic to also issue a fast assert command when a command is received. In the above example, this would result in the clock switching logic receiving a fast assert command (when the mass storage engine receives a new command), followed shortly by a slow assert command (when the mass storage engine receives notification that a previous command has completed and the queue is empty), followed shortly again by a fast assert command (when the new command is received by the RAID/UAS queue engine 140 and placed in the queue).

How the logic decides that it is safe to lower the system clock rate can vary based on implementation. In one embodiment of the present invention, when a command is received it is added to the mass storage command queue buffer 136. The command is then sent to an appropriate SATA drive connected to the bridge for execution. Only when a completion message is received from the SATA drive, indicating the command has been completed, is the command removed from the mass storage command queue buffer 136. Thus, in one embodiment of the present invention, the logic decides that it is safe to lower the system clock rate when there are no more commands in the mass storage command queue buffer 136. Of course, one of ordinary skill in the art will recognize that there may be other ways to detect that all commands have been completed, such as via the tracking of completion messages, and the present invention should not be limited to an embodiment where the mass storage command queue buffer 136 is relied upon as the indicator.

The result is that the system clock rate is only lowered once the final outstanding status has been communicated to the relevant USB mass storage engine 112 or 118.

The actual changing of the clock rate can be executed by a clock divider block which exists in the system clock domain. This component can accept the various fast assert and slow assert commands and set the clock speed accordingly.

Figure 2:
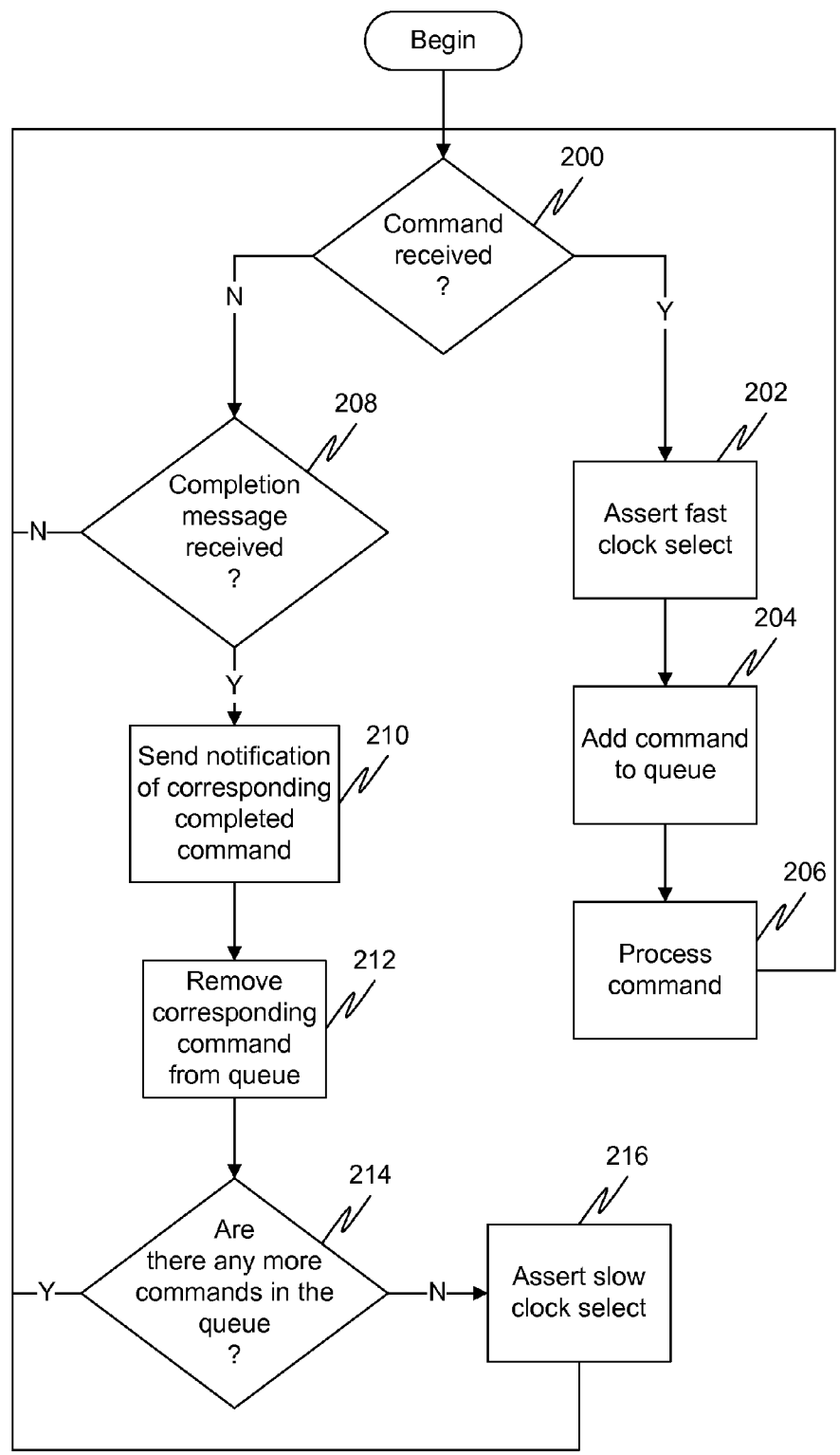
FIG. 2 is a flow diagram illustrating a method for dynamically adjusting a system clock rate in accordance with an embodiment of the present invention.

FIG. 2 is a flow diagram illustrating a method for dynamically adjusting a system clock rate in accordance with an embodiment of the present invention. This method may be implemented on, for example a bridge between a host computer and one or more storage devices. At 200, it is determined if a command has been received. If so, then at 202 a fast clock select command is asserted. The fast clock select command indicates to a clock divider block to dynamically adjust the system clock rate to a fast setting (if it is not already at a fast setting). It should be noted that in some embodiments it may be desirable to first check if the clock is already at a fast setting before issuing this command.

Then, at 204, the command is added to a queue. This queue may be, for example, a mass storage command queue buffer. At 206, the command is processed.

If at 200 it is determined that a command has not been received, then at 208 it is determined if a completion message has been received. A completion message indicates that a command has been completed by the storage device, such as a SATA disk drive attached to the bridge. If at 208 it is determined that a completion message has been received, at 210 a notification of the corresponding completed command may be sent. It should be noted that in some embodiments it may be necessary to determine which command the completion message corresponds to. This may be accomplished by, for example, looking for an identification field of the completion message and lining it up with an identification field of the commands in the queue.

At 212, the corresponding command can be removed from the queue. Then at 214, it is determined if there are any more commands in the queue. If not, then the queue is empty and it can be assumed that there are no more commands for the system to execute at this time, and thus at 216 a slow clock select can be asserted to dynamically reduce the clock speed.

It should be noted that the precise speeds at which to set the system clock rate (i.e., corresponding to "fast clock" and "slow clock") may vary based on implementation. In one embodiment of the present invention, the "fast clock" rate is set at the typical operating clock rate for the components in question. For example, in a USB3.0-to-SATA bridge, it is common to run the system components at a clock rate of 500 MBps, which is suitable to match the USB3.0 maximum bandwidth of 500 MBPps. In such a case, where the data paths are 32-bits wide, a 125 MHZ clock can be used to satisfy this requirement. Of course, embodiments are foreseen wherein the fast clock is set based on some other determination. For example, in some systems it may be desirable to overclock the system components, resulting in a higher "fast clock" rate.

For purposes of this disclosure, unless specifically recited, the exact values for a "fast speed" system clock and a "slow speed" system clock are largely irrelevant. The term "fast speed" shall be construed broadly as meaning any speed faster than a "slow speed."

In one embodiment of the present invention, the "slow clock" rate may be set at the minimum clock rate necessary to operate the system components. For example, a certain amount of processing power may still need to be utilized to monitor the components and/or maintain the queue. Of course, embodiments are foreseen wherein the slow clock is set based on some other determination.

There are two main mass storage protocols used with USB-to-SATA bridges: Bulk only Transport (BoT) and USB attached SCSI (UAS). For BoT, only a single command may be outstanding at once. In such embodiments, it may not be necessary to maintain a queue for commands, as only one command is handled at a time. Only once a completion message is received is the command "released." In such embodiments, once a command is released, the system can select the slow clock rate. When a new command is received, the system can go back to the fast clock rate.

For UAS, there may be many commands outstanding, and in this case the system may only select the slow clock frequency when the number of outstanding commands is zero. Thus, it will not switch to a slow speed while there are commands to process (e.g., in the queue), and thus the performance will not be impacted. Once all the commands are complete, the system can go to the lower power slow clock rate.

In an alternative embodiment of the present invention, a slow clock rate is used for a fixed period of time, at the expiration of which a fast clock rate is automatically asserted. This embodiment may be most useful in systems where the storage devices have a guaranteed minimum execution time, and thus it can be assumed that while a command is executing the system can be run at a slow clock rate, only reverting to a fast clock rate in order to process the response from the storage device after the command has executed.

For example, an embodiment of the present invention may modify the assert slow clock select command so that it contains a time period limitation, such that the clock speed automatically reverts to the fast clock speed after the time period has expired.

Figure 3:
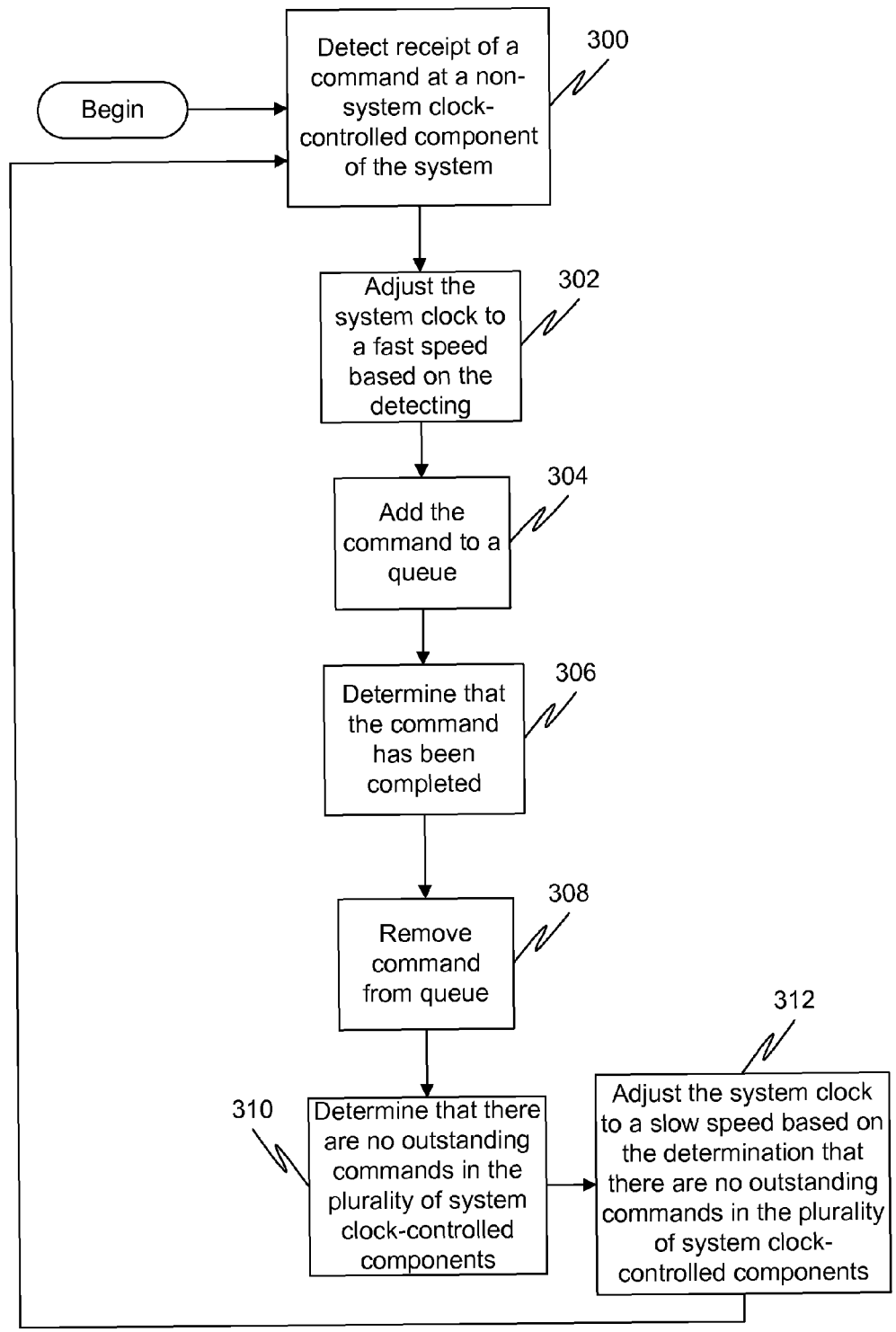
FIG. 3 is a flow diagram illustrating a method for dynamically adjusting a system clock of a plurality of system clock-controller components in a system in accordance with another embodiment of the present invention.

FIG. 3 is a flow diagram illustrating a method for dynamically adjusting a system clock of a plurality of system clock-controller components in a system in accordance with another embodiment of the present invention. This method may be performed at a bridge between a host computer and one or more storage devices. At 300, the receipt of a command at a non-system clock-controlled component of the system is detected. At 302, the system clock is adjusted to a fast speed based on the detecting. The fast speed may be based on a clock speed of an interface between the bridge and the host device. At 304, also in response to the detecting, the command may be added to a queue. At 306, it is determined that the command has been completed. At 308, the command may be removed from the queue. At 310, it is determined that there are no outstanding commands in the plurality of system clock-controlled components. At 312, the system clock is adjusted to a slow speed based on the determination that there are no outstanding commands in the plurality of system clock-controlled components.

Figure 4:
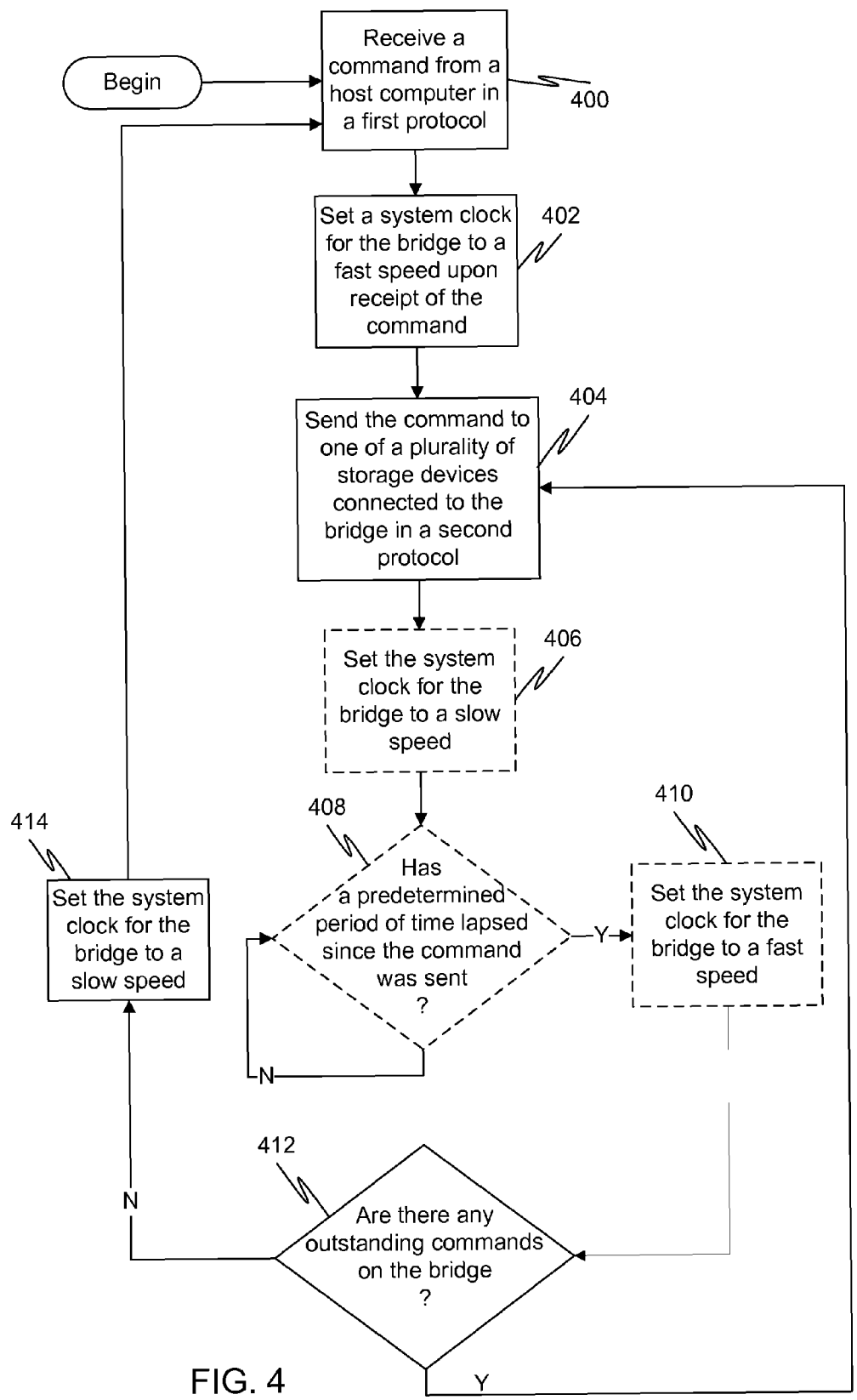
FIG. 4 is a flow diagram illustrating a method for dynamically adjusting a system clock rate of a bridge in accordance with another embodiment of the present invention.

FIG. 4 is a flow diagram illustrating a method for dynamically adjusting a system clock rate of a bridge in accordance with another embodiment of the present invention. At 400, a command is received from a host computer in a first protocol. The first protocol may be, for example, a USB protocol. At 402, a system clock for the bridge is set to a fast speed upon receipt of the command. At 404, the command is sent to one of a plurality of storage devices connected to the bridge in a second protocol. The second protocol may be, for example, a SATA protocol. AT 406, the system clock for the bridge may be set to a slow speed. This is part of an optional embodiment where the system clock is set to slow for a predetermined period of time. At 408, it is determined if this predetermined period of time has lapsed since the command was sent. If so, then at 410, the system clock for the bridge may be set to a fast speed. Then at 412 it is determined if there are any outstanding commands on the bridge. If not, then at 414, the system clock is set to a slow speed.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for dynamically adjusting a system clock of a plurality of system clock-controlled components in a system, the method comprising:
   detecting the receipt of a mass storage command at a command queue buffer of a non-system clock-controlled component of the system; and
   adjusting the system clock to a fast speed based on the detecting;
   determining that the mass storage command has been completed;
   determining that there are no outstanding mass storage commands in the plurality of system clock-controlled components; and
   adjusting the system clock to a slow speed based on the determination that there are no outstanding mass storage commands in the plurality of system clock-controlled components.

2. The method of claim 1, further comprising:
   in response to the detecting the receipt of a command, adding the mass storage command to the command queue buffer; and
   in response to determining that the command has been completed, removing the mass storage command from the command queue buffer.

3. A method for dynamically adjusting a system clock of a plurality of system clock-controlled components in a system, the method comprising:
   detecting the receipt of a mass storage command at a command queue buffer of a non-system clock-controlled component of the system;
   adjusting the system clock to a fast speed based on the detecting;
   determining that the mass storage command has been completed;
   determining that there are no outstanding mass storage commands in the plurality of system clock-controlled components; and
   adjusting the system clock to a slow speed based on the determination that there are no outstanding mass storage commands in the plurality of system clock-controlled components:
      wherein the method is performed at a bridge between a host computer and one or more storage devices, wherein the fast speed is based on a clock speed of an interface between the bridge and the host device.

4. The method of claim 3, wherein the system clock-controlled components include a queue engine, an encryption core, and interface logic for the connection between the bridge and the one or more storage devices.

5. A method for dynamically adjusting a clock rate of a system clock of a portion of a bridge having a variable clock rate, the method comprising:
   receiving a mass storage command, at a command queue buffer, from a host computer in a first protocol;
   setting a system clock for the bridge to a fast speed upon receipt of the mass storage command;
   determining if there are any outstanding mass storage commands in the bridge; and
   if there are no outstanding mass storage commands in the bridge, setting the system clock to a slow speed.

6. The method of claim 5, further comprising:
   sending the mass storage command to one of a plurality of storage devices connected to the bridge in a second protocol;
   setting the system clock to a slow speed;
   determining if a predetermined period of time has lapsed since the mass storage command has been sent; and
   setting the system clock to a fast speed if the predetermined period of time has lapsed.

7. The method of claim 5, wherein the mass storage command is received and the system clock is set to a fast speed by a component of the bridge not controlled by the system clock.

8. The method of claim 5, wherein the first protocol is a Universal Serial Bus (USB) protocol.

9. The method of claim 6, wherein the second protocol is a Serial ATA (SATA) protocol.

10. A bridge comprising:
    a system clock of the bridge;
    a plurality of system clock-controlled components; and
    a plurality of non-system clock-controlled components, wherein at least one of the non-system clock controlled components is designed to:
       detect the receipt of a mass storage command at a command queue buffer of a non-system clock-controlled component;
       send a message to a system clock divider to cause the system clock divider to change the rate of the system clock from a slow speed to a fast speed;
       determine that the mass storage command has been completed;
       determine that there are no outstanding mass storage commands in the plurality of system clock-controlled components; and
       adjust the system clock to a slow speed based on the determination that there are no outstanding mass storage commands in the plurality of system clock-controlled components.

11. The bridge of claim 10, wherein the at least one of the non-system clock controlled components is a mass storage engine.

12. A mass storage engine comprising:
a mass storage engine;
command queue buffer; and
logic to control a system clock by detecting the receipt of a mass storage command and causing the system clock to increase speed based on the receipt of the mass storage command, and to determine that the command queue buffer has no outstanding mass storage commands left and to cause the system clock to decrease speed based on the determination that the command queue buffer has no outstanding mass storage commands left.

13. The mass storage engine of claim 12, wherein both the mass storage engine and command queue buffer are components of a bridge.

14. The mass storage engine of claim 12, wherein the mass storage engine has no outstanding mass storage commands left when the command queue buffer is empty.

15. A program storage device readable by a machine tangibly embodying a program of instructions executable by the machine to perform a method for dynamically adjusting a system clock of a plurality of system clock-controlled components in a system, the method comprising:
  detecting the receipt of a mass storage command at a command queue buffer of a non-system clock-controlled component of the system;
  adjusting the system clock to a fast speed based on the detecting;
  determining that the command has been completed;
  determining that there are no outstanding mass storage commands in the plurality of system clock-controlled components; and
  adjusting the system clock to a slow speed based on the determination that there are no outstanding mass storage commands in the plurality of system clock-controlled components.

16. The program storage device of claim 15, wherein the program storage device is accessible by a mass storage engine.

* * * * *